United States Patent
Hunzeker

(10) Patent No.: US 11,992,797 B2
(45) Date of Patent: May 28, 2024

(54) CAGE ASSEMBLY FOR DISLODGING MATERIAL BUILDUP WITHIN PNEUMATIC CONVEYANCE SYSTEMS AND RELATED METHODS

(71) Applicant: Daniel Hunzeker, Layton, UT (US)

(72) Inventor: Daniel Hunzeker, Layton, UT (US)

(*) Notice: Subject to any disclaimer, the term of this patent is extended or adjusted under 35 U.S.C. 154(b) by 0 days.

(21) Appl. No.: 18/313,657

(22) Filed: May 8, 2023

(65) Prior Publication Data

US 2023/0271127 A1  Aug. 31, 2023

Related U.S. Application Data

(63) Continuation of application No. 17/627,030, filed as application No. PCT/US2020/042210 on Jul. 15, 2020, now Pat. No. 11,666,847.

(60) Provisional application No. 62/874,894, filed on Jul. 16, 2019.

(51) Int. Cl.
| | |
|---|---|
| *B01D 46/04* | (2006.01) |
| *B01D 46/02* | (2006.01) |
| *B01D 46/681* | (2022.01) |
| *B65G 53/06* | (2006.01) |
| *B65G 53/34* | (2006.01) |

(52) U.S. Cl.
CPC .......... *B01D 46/02* (2013.01); *B01D 46/681* (2022.01); *B65G 53/06* (2013.01); *B65G 53/34* (2013.01)

(58) Field of Classification Search
None
See application file for complete search history.

(56) References Cited

U.S. PATENT DOCUMENTS

| | | | | |
|---|---|---|---|---|
| 2,136,853 A | * | 11/1938 | Knecht | B01D 29/44 |
| | | | | 210/414 |
| 3,765,152 A | * | 10/1973 | Pausch | B01D 46/4281 |
| | | | | 95/279 |
| 3,942,842 A | | 3/1976 | Young, Jr. | |

(Continued)

FOREIGN PATENT DOCUMENTS

| | | |
|---|---|---|
| CN | 2199811 Y | 6/1995 |
| CN | 108854303 A | 11/2018 |

(Continued)

OTHER PUBLICATIONS

Leonard I. Nass, "Polyvinyl Chloride", *Encyclopedia of PVC*, New York (1976 & 1977), vols. 1-3, p. 1128.

(Continued)

*Primary Examiner* — Joseph A Dillon, Jr.
(74) *Attorney, Agent, or Firm* — Ray, Quinney & Nebeker; Daniel J. Bezdjian

(57) ABSTRACT

A pneumatic conveyance system includes at least one filtration component and a cage assembly disposed within the filtration component. The cage assembly may include a first cage, a second cage, and an actuator, where the actuator may be configured to move the first cage relative to the second cage and cause at least a portion of the first cage to rub against a filtration component within the pneumatic conveyance system. A method of dislodging material buildup within a pneumatic conveyance system includes causing a first cage of a cage assembly to move relative to a second cage within a filtration component.

17 Claims, 19 Drawing Sheets

(56) References Cited

U.S. PATENT DOCUMENTS

| | | | |
|---|---|---|---|
| 3,979,194 A * | 9/1976 | Wiser | B01D 50/20 |
| | | | 55/296 |
| 4,005,908 A | 2/1977 | Freeman | |
| 4,318,643 A | 3/1982 | Larsson et al. | |
| 4,401,446 A * | 8/1983 | Johnson, Jr. | B01D 46/02 |
| | | | 95/286 |
| 4,482,367 A | 11/1984 | Howeth | |
| 4,516,887 A | 5/1985 | Richter et al. | |
| 4,572,726 A | 2/1986 | Van Abbema | |
| 4,668,131 A | 5/1987 | Hart et al. | |
| 4,681,609 A | 7/1987 | Howeth | |
| 4,804,481 A | 2/1989 | Lennartz | |
| 4,844,665 A * | 7/1989 | Howell | B01D 50/20 |
| | | | 406/173 |
| 4,881,855 A | 11/1989 | Rempel et al. | |
| 4,885,012 A | 12/1989 | Thompson | |
| 5,053,129 A | 10/1991 | Kitson | |
| 5,071,290 A * | 12/1991 | Johnson | B01D 46/02 |
| | | | 406/41 |
| 5,163,786 A | 11/1992 | Christianson | |
| 5,518,343 A | 5/1996 | Howell | |
| 5,934,476 A | 8/1999 | Roe | |
| 6,068,429 A | 5/2000 | Schultheis | |
| 6,082,934 A | 7/2000 | Reinsch et al. | |
| 6,296,423 B1 * | 10/2001 | Cahill | B65G 53/34 |
| | | | 406/70 |
| 6,540,914 B1 * | 4/2003 | Smith | B01D 35/143 |
| | | | 210/402 |
| 7,371,267 B2 | 5/2008 | Pipkorn et al. | |
| 7,998,253 B2 * | 8/2011 | Gregg | B01D 50/20 |
| | | | 95/286 |
| 9,174,812 B2 * | 11/2015 | Harris | B65G 53/60 |
| 9,944,473 B2 | 4/2018 | Bent et al. | |
| 11,433,345 B2 | 9/2022 | Park | |
| 11,452,963 B2 * | 9/2022 | Tanaka | B01D 46/0053 |
| 2011/0220586 A1 * | 9/2011 | Levitt | B01D 29/906 |
| | | | 210/791 |
| 2011/0229276 A1 | 9/2011 | Eder et al. | |
| 2012/0243950 A1 | 9/2012 | Ruggero et al. | |
| 2012/0301230 A1 | 11/2012 | Marchesini et al. | |
| 2012/0304860 A1 * | 12/2012 | Matson | B01D 46/02 |
| | | | 55/367 |
| 2013/0219842 A1 | 8/2013 | Strugalski et al. | |
| 2013/0227921 A1 * | 9/2013 | Appelo | B01D 46/02 |
| | | | 55/378 |
| 2014/0270996 A1 | 9/2014 | Thiele | |
| 2015/0110565 A1 | 4/2015 | Harris | |
| 2016/0280473 A1 | 9/2016 | Veselov et al. | |
| 2016/0310877 A1 | 10/2016 | Levitt | |
| 2017/0113883 A1 | 4/2017 | Bondeson et al. | |
| 2017/0369257 A1 | 12/2017 | Bent et al. | |
| 2018/0178155 A1 | 6/2018 | Nicolaou et al. | |
| 2018/0340877 A1 | 11/2018 | Thuman | |
| 2019/0009281 A1 | 1/2019 | Kraxner et al. | |
| 2019/0162440 A1 | 5/2019 | Suchansky et al. | |
| 2019/0255794 A1 | 8/2019 | Bishop | |
| 2021/0276259 A1 | 9/2021 | Roman et al. | |

FOREIGN PATENT DOCUMENTS

| | | | | |
|---|---|---|---|---|
| CN | 108939731 A | | 12/2018 | |
| CN | 208356316 | | 1/2019 | |
| CN | 109529471 | | 3/2019 | |
| CN | 208959421 | | 6/2019 | |
| CN | 110681218 B | * | 9/2020 | |
| CN | 112551172 A | | 3/2021 | |
| CN | 114534388 A | | 5/2022 | |
| CN | 115364584 A | * | 11/2022 | |
| CN | 116116124 A | * | 5/2023 | |
| EP | 3326706 | | 11/2017 | |
| GB | 1319971 | | 6/1973 | |
| JP | H08182910 | | 7/1996 | |
| JP | 2006000704 | | 1/2006 | |
| JP | 2006263706 A | * | 10/2006 | B01D 46/0065 |
| JP | 2016049513 | | 4/2016 | |
| JP | 202080051228.7 | | 2/2023 | |
| JP | 202080051228.7 | | 6/2023 | |
| SU | 770962 | | 10/1980 | |
| WO | 2006/090548 | | 8/2006 | |

OTHER PUBLICATIONS

International Search Report for International Application No. PCT/US20/42210, mailed Oct. 13, 2020, 2 pages.
International Written Opinion for International Application No. PCT/US20/42210, mailed Oct. 13, 2020, 5 pages.
Russian Office Action and Search Report for Russian Application No. 2022103539/05 (007580), dated Sep. 8, 2023, 12 pages.
Extended European search report ("European Patent Office") for European Application No. 20841100.9-1101, dated Jun. 20, 2023, 5 pages.
Matthews, Brian, "*New Nozzle Technology 'Cleaning More with Less'*", *Scientific Dust Collectors* Feb. 2013, 4 pages.
Cutting Tool Engineering, "*Roto-Pulse Cartridge-Cleaning System*", accessed from https://www.ctemag.com/products/roto-pulse-cartridge-cleaning-system Jul. 31, 2023, 5 pages.

* cited by examiner

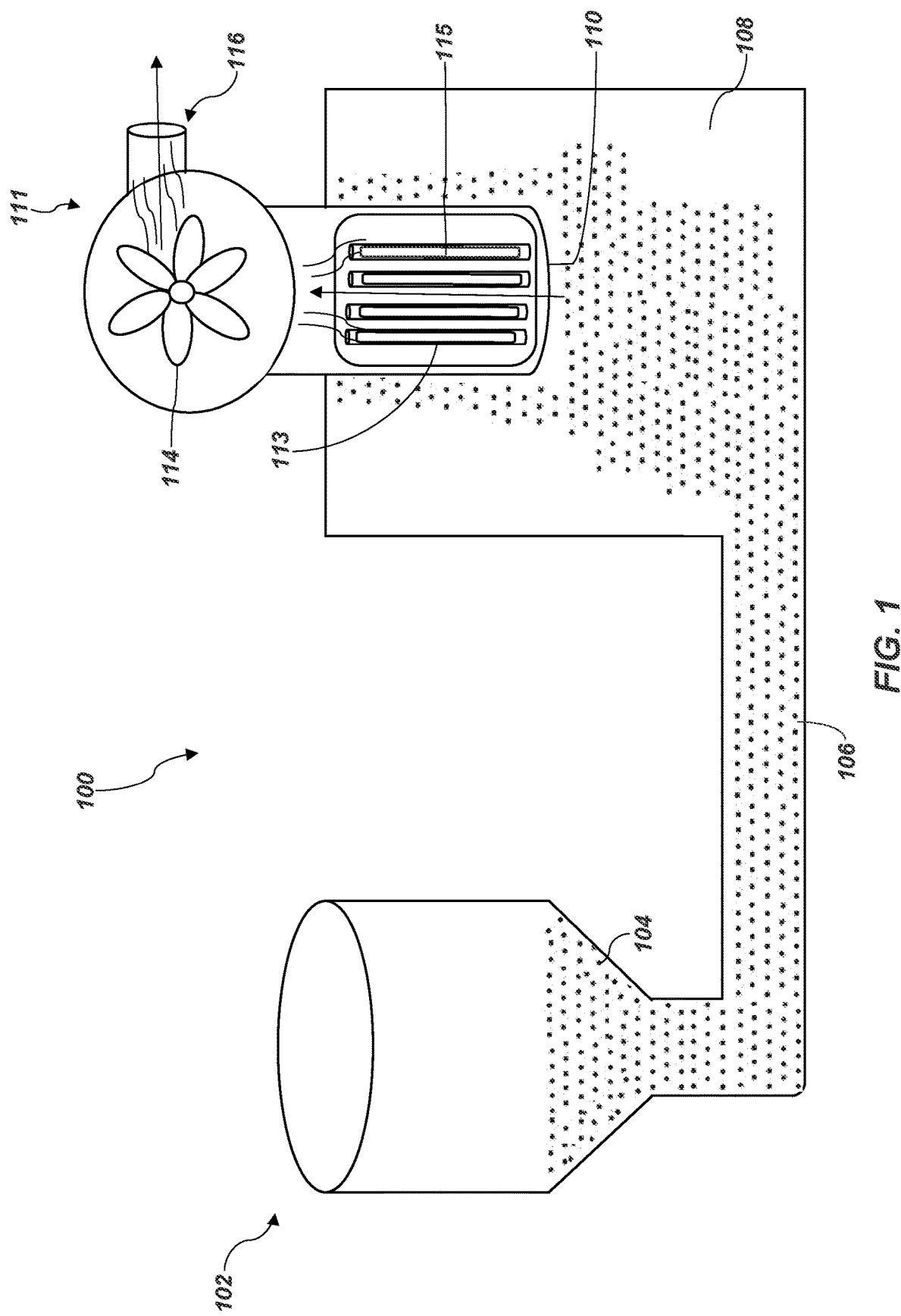

CAGE ASSEMBLY FOR DISLODGING MATERIAL BUILDUP WITHIN PNEUMATIC CONVEYANCE SYSTEMS AND RELATED METHODS

CROSS-REFERENCE TO RELATED APPLICATIONS

This application is a continuation of U.S. patent application Ser. No. 17/627,030, filed Jan. 13, 2022, which is a national phase entry under 35 U.S.C. § 371 of International Patent Application PCT/US2020/042210, filed Jul. 15, 2020, designating the United States of America and published as International Publication WO 2021/011707 on Jan. 21, 2021, which claims the benefit under Article 8 of the Patent Cooperation Treaty to U.S. Provisional Patent Application Ser. No. 62/874,894, filed Jul. 16, 2019, for "Cage for Removing Buildup of Bulk Solids From Coverings Inside Baghouses and Related Methods."

TECHNICAL FIELD

Embodiments of the present disclosure relate generally to systems of pneumatic conveyance. More particularly, this disclosure relates to cage assemblies of pneumatic conveyance systems for dislodging and removing buildup from filtration components of the pneumatic conveyance systems.

BACKGROUND

Pneumatic conveyance systems involve the transfer of fluid and bulk solids through a system, and often include a filtration system to separate and remove the solid matter (e.g., flour, powders, etc.) from the fluid (e.g., air). The solid matter may accumulate on filtration components (e.g., bags, socks, permeable tubes) of the filtration system, which may result in reduced efficiency of the systems and/or blockages within other components of the system.

Conventionally, there are three primary methods for removing buildup of the solid matter from the filtration components. A first method typically includes attaching the filtration system to a lever, which is then attached to a shaker mechanism. The shaker mechanism is activated to dislodge accumulated buildup from the filtration components of the filtration system. Shaking the entire filtration system can result in significant damage to the filtration system and limits materials that can be used in the filtration system. A second method involves using reverse flowing air (opposite a flow of the air used to transfer the bulk solids) within the filtration system. Reversing the flow of air through the filtration system can negatively impact the flow of the bulk solids and can result in blockages within other components of the systems. A third method involves using compressed fluid (e.g., air) to force a burst of fluid through the filtration components. The burst of fluid creates a wave that travels through the filtration components filtration system, which can dislodge buildup on the filtration components of the filtration system.

BRIEF SUMMARY

In some embodiments, the present disclosure includes a pneumatic conveyance system, which may include at least one filtration component, as well as a cage assembly disposed within the filtration component. The cage assembly may include an actuator, a first cage, and a second cage. The actuator may be configured to move the first cage relative to the second cage, and may cause at least a portion of the first cage to rub against a filtration component within the pneumatic conveyance system.

In some embodiments, the present disclosure includes a method of dislodging material buildup within a pneumatic conveyance system. The method may include causing a first cage of a cage assembly to move relative to a second cage within a filtration component in a first direction, and may also include causing the first cage of the cage assembly to move relative to the second cage within the filtration component in a second direction.

BRIEF DESCRIPTION OF THE DRAWINGS

FIG. 1 is a schematic view of a pneumatic conveyance system according to one or more embodiments of the present disclosure.

DETAILED DESCRIPTION

Figure 2A:
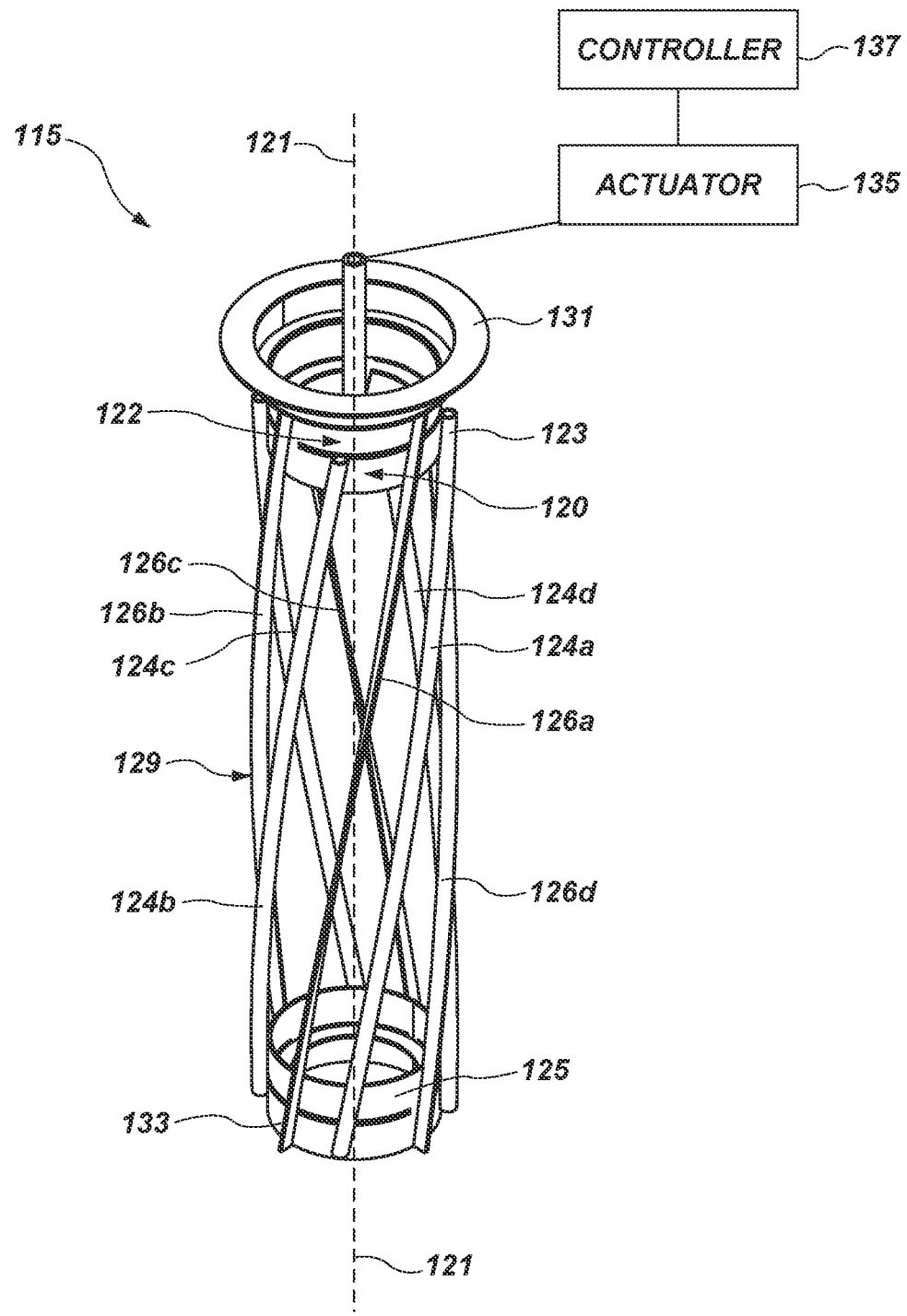
FIG. 2A is a perspective view of a cage assembly according to one or more embodiments of the present disclosure.

Embodiments of the present disclosure include pneumatic conveyance systems including filtration systems (e.g., bag houses), filtration components (e.g., bags and/or socks), and cage assemblies for holding the filtration components in place and for dislodging (e.g., removing) material buildup from the surfaces of the filtration components. Throughout the description, functionally similar elements (e.g., structures, materials) may be referred to with similar reference numerals incremented by 100, 300, 400, 500, 700, respectively. To avoid repetition, not all features shown in all of FIGS. 1-5 and 7 are described in detail herein. Rather, unless described otherwise below, an element described in regard to any of FIGS. 1-5 and 7 designated by a reference numeral that is a 100, 300, 400, 500, 700 increment of a reference numeral of a previously or later described element will be understood to be at least substantially similar to the previously or later described element.

The illustrations presented herein are not meant to be actual views of any particular cage assembly, pneumatic conveyance system, or component thereof, but are merely idealized representations, which are employed to describe example embodiments of the present disclosure.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features, and methods usable in combination therewith should or must be excluded.

As used herein, the terms "comprising," "including," "containing," "characterized by," and grammatical equivalents thereof are inclusive or open-ended terms that do not exclude additional, un-recited elements or method steps, but also include the more restrictive terms "consisting of," "consisting essentially of," and grammatical equivalents thereof.

As used herein, any relational term, such as "first," "second," "over," "beneath," "top," "bottom," "underlying," "upward," "downward," etc., is used for clarity and convenience in understanding the disclosure and accompanying drawings, and does not connote or depend on any specific preference, orientation, or order, except where the context clearly indicates otherwise.

As used herein, the term "configured" refers to a size, shape, material composition, and arrangement of one or more of at least one structure and at least one system facilitating operation of one or more of the structure and the system in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

As used herein, the term "about" used in reference to a given parameter is inclusive of the stated value and has the meaning dictated by the context (e.g., it includes the degree of error associated with measurement of the given parameter).

As used herein, the terms "buildup" and "bulk solids" and their equivalents refer to substances that yield (e.g., move) in response to external pressure and/or forces. For example, bulk solids may include one or more of dust, flour, powders, and particulates.

As used herein, the term "filtration component" and its equivalents refer to flexible and permeable filtration media, such as, for example, an oval or round tube made of woven or felted material, or a cartridge filter.

Embodiments of the present disclosure include cage assemblies that may be disposed within filtration components (e.g., bags, socks, permeable tubes) of a pneumatic conveyance system (feeders, extrusion machines, pelletizers, packaging machines, vacuums, etc.). The cage assemblies may include movable components that rub against (e.g., pass across) interior surfaces of the filtration components to flex the filtration components and dislodge buildup of materials on exterior surfaces of and/or within the filtration components. For example, each cage assembly may include a first cage and a second cage that share a common center longitudinal axis. The first cage may be movable (e.g., rotatable or translatable) relative to the second cage and relative to an associated filtration component. The first cage may be coupled to an actuator device, which may cause the first cage to move relative to the second cage and relative to an associated filtration component. Furthermore, while moving, the first cage may rub against an interior surface of the filtration component and may cause the filtration component to flex and deform, which results in buildup of materials on an exterior surface of the filtration component being dislodged and removed from the exterior surface.

The cage assemblies of the present disclosure and methods of utilizing the cage assemblies for removing material buildup from filtration components of the present disclosure are advantageous over conventional systems because the cage assemblies and methods do not require vibrating or shaking the filtration components of pneumatic conveyance systems, which can cause significant damage to the filtration components and/or pneumatic conveyance systems and shorten life cycles of the filtration components and/or pneumatic conveyance systems. Conversely, the cage assemblies and methods of the present disclosure may lead to longer life cycles of the filtration components and/or pneumatic conveyance systems in comparison to conventional systems. Additionally, the cage assemblies and methods of the present disclosure do not require that a velocity of a bulk solid being moved via a pneumatic conveyance system be reduced to clear buildup. Therefore, the cage assemblies and methods of the present disclosure mitigate risks and a likelihood of clogs occurring within the pneumatic conveyance systems during operation. Additionally, the cage assemblies and methods of the present disclosure are relatively easy to manufacture, require less energy than conventional systems, and can be retrofitted to current pneumatic conveyance systems. As a result, the cage assemblies and methods of the present disclosure may decrease costs of operation in comparison to conventional pneumatic conveyance systems and may provide relatively inexpensive replacement systems.

FIG. 1 is a schematic view of a pneumatic conveyance system 100 according to one or more embodiments of the present disclosure. For example, as is described in greater detail below, the pneumatic conveyance system 100 may utilize air flow to transfer bulk materials such as, for example, powders and granules from one process area to another. For instance, the pneumatic conveyance system 100 may be used to transfer flour, starch, sugar, cement powders, carbon black, coal fines, sands, metal powders, granular materials, and/or pelletized materials from a first location to another. The pneumatic conveyance system 100 may include a dilute phase pneumatic conveyance system and/or a dense phase pneumatic conveyance system.

In some embodiments, the pneumatic conveyance system 100 may include a hopper 102, a material conveying conduit 106, a receptacle 108, and a conveyor system 111. The material conveying conduit 106 extends between the hopper 102 and the receptacle 108, and the conveyor system 111 may be disposed at least partially within the receptacle 108. The conveyor system 111 may move the material 104 (e.g., particulate matter) from the hopper 102 to the receptacle 108 using a combination of pressure differential and fluid flow (e.g., air flow). For example, the conveyor system 111 may include a blower or fan 114, a bag compartment 110, and an outlet 116. In operation, the blower or fan 114 may suck in fluid through the bag compartment 110 and may expel fluid through the outlet.

The bag compartment 110 may include one or more filtration components 113 and one or more cage assemblies 115 disposed within the filtration components 113. For example, each filtration component 113 may include a cage assembly 115 disposed within the filtration component 113. In some embodiments, the filtration component 113 may include one or more of a bag or sock formed from a flexible and permeable material (e.g., a conventional filter bag).

In operation, material 104 being moved via the pneumatic conveyance system 100 may accumulate on the filtration component 113. As is described in greater detail below in regard to FIGS. 2A-4E, one or more elements of the cage assembly 115 may be actuated to move relative to the filtration component 113, rub against an interior surface of the filtration component 113, and flex the filtration component 113 in order to dislodge and remove material 104 accumulated on an exterior surface of the filtration component 113.

Figure 2B:
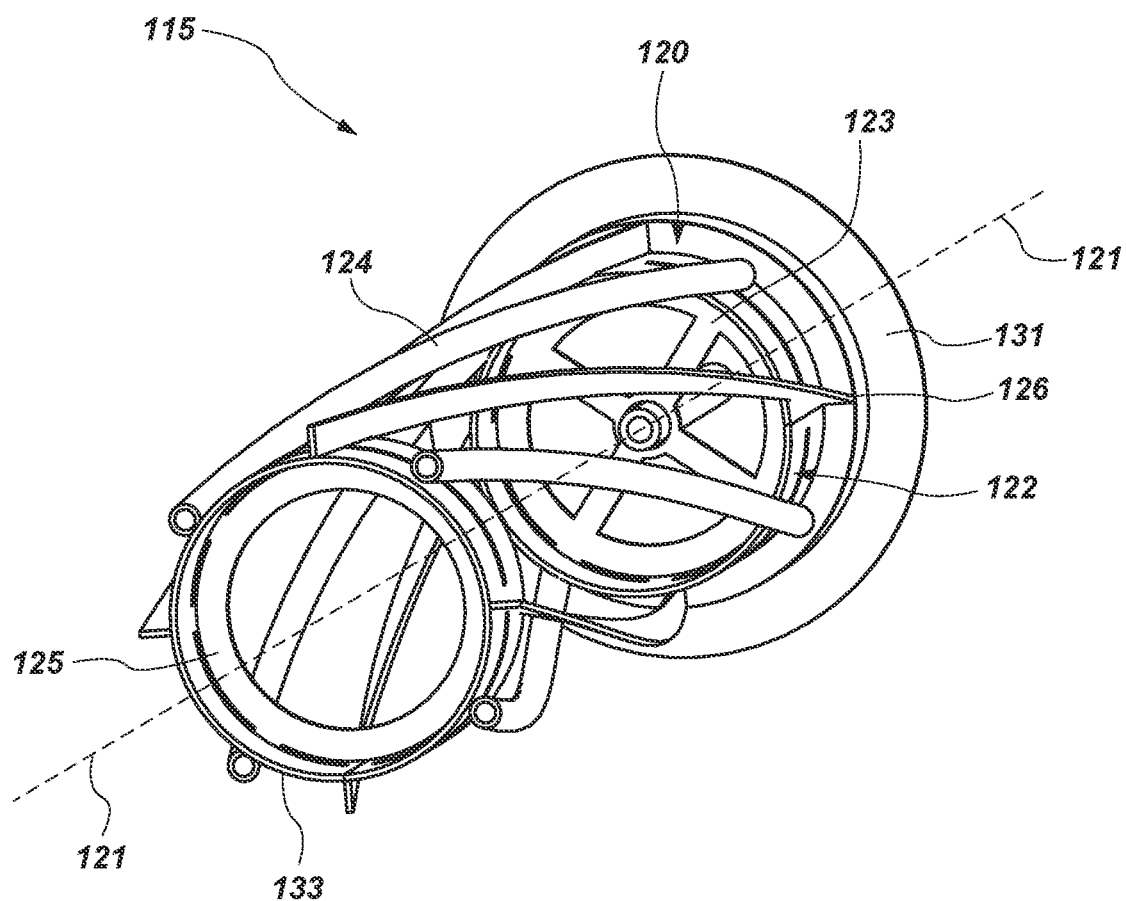
FIG. 2B is a bottom view of the cage assembly of FIG. 2A.
Figure 2C:
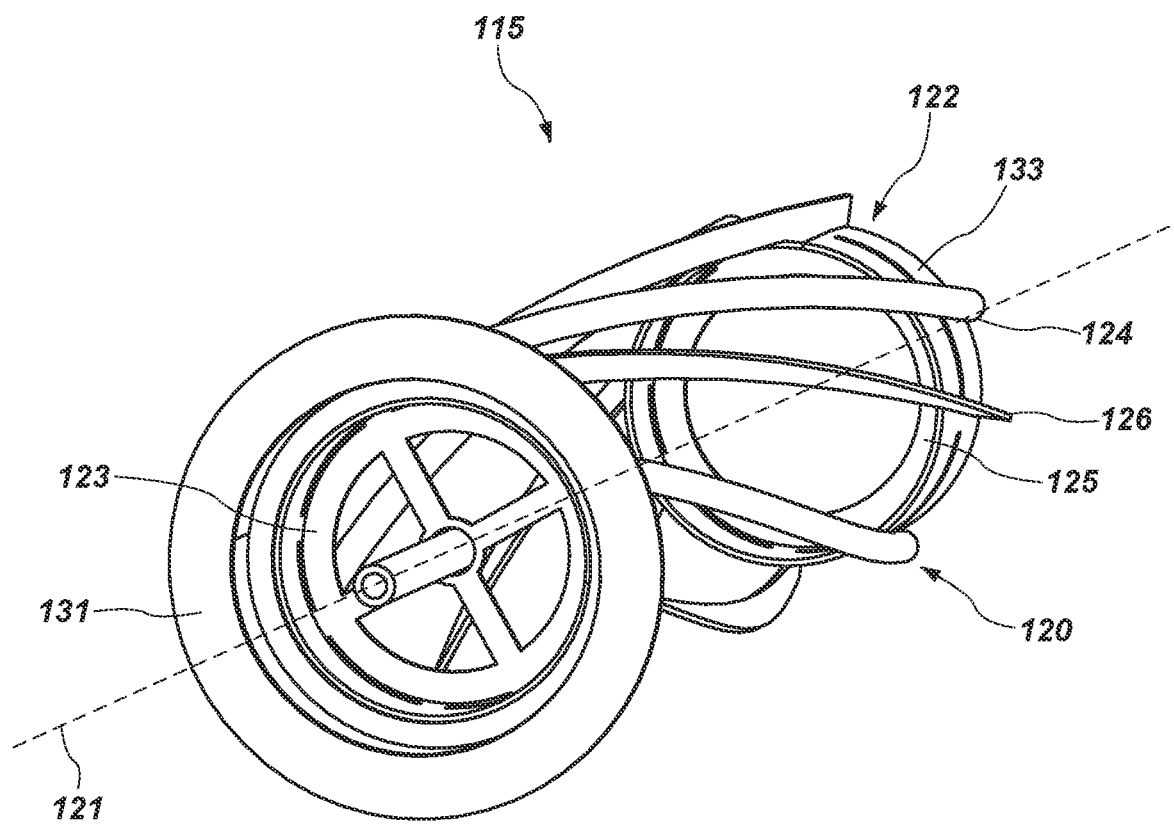
FIG. 2C is a top view of the cage assembly of FIG. 2A.
Figure 2D:
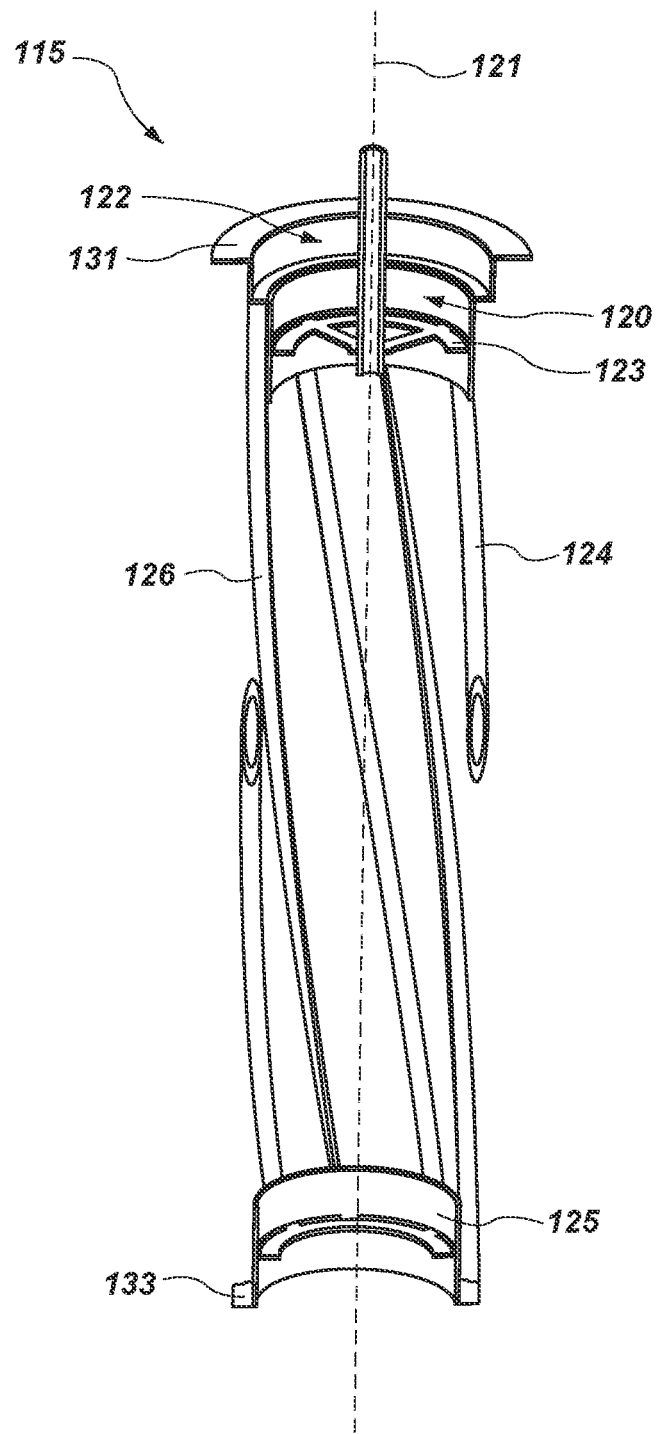
FIG. 2D is a cross-sectional view of the cage assembly of FIG. 2A.
Figure 2E:
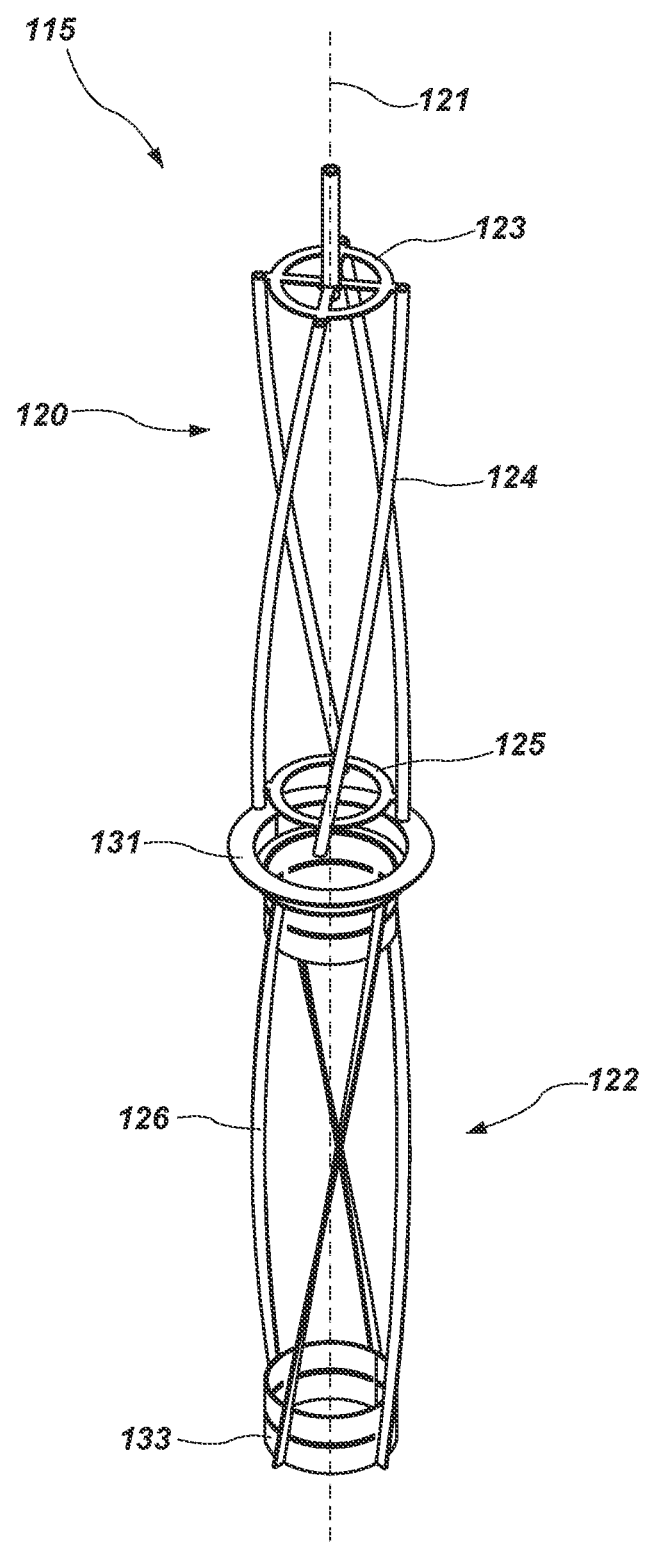
FIG. 2E is an exploded view of the cage assembly of FIG. 2A.

FIG. 2A is a perspective view of a cage assembly 115 according to one or more embodiments of the present disclosure. FIGS. 2B and 2C are bottom and top views, respectively, of the cage assembly 115 of FIG. 2A. FIG. 2D is a side cross-sectional view of the cage assembly 115 of FIG. 2A. FIG. 2E is an exploded view of the cage assembly 115 of FIG. 2A.

Referring to FIGS. 2A-2E together, the cage assembly 115 may include a first cage 120 and a second cage 122. The first cage 120 and the second cage 122 may share a center longitudinal axis 121, and one of the first or second cages 120, 122 may be configured to rotate about the center longitudinal axis relative to the other of the first or second cages 120, 122.

The first cage 120 may include a first upper annular member 123, a first lower annular member 125, and a first plurality of helical members 124a, 124b, 124c, 124d extending between the first upper annular member 123 and the first lower annular member 125. The first plurality of helical members may be referred to herein collectively with the reference numeral "124." Additionally, one or more of the first plurality of helical members may generally be referred to with the reference numeral "124." As used herein, the term "helical," when used in reference to members of the first and/or second cages 120, 122, indicates that center longitudinal axes of the referenced members have a general shape of at least a portion of a helix and/or spiral. In some embodiments, each of the first plurality of helical members 124a, 124b, 124c, 124d may have an arcuate radially outermost surface 129 intended to contact and rub against an interior surface of an associated filtration component 113.

The second cage 122 may include a second upper annular member 131, a second lower annular member 133, and a second plurality of helical members 126a, 126b, 126c, 126d extending between the second upper annular member 131 and the second lower annular member 133. The second plurality of helical members may be referred to herein collectively with the reference numeral "126." Additionally, one or more of the second plurality of helical members may generally be referred to with the reference numeral "126." In some embodiments, each of the first plurality of helical members 124a, 124b, 124c, 124d may have a general blade shape for contacting the interior surface of the associated filtration component 113 (FIG. 1). Each helical member 124 of the first plurality of helical members 124a, 124b, 124c, 124d may be disposed between two adjacent helical members 126 of the second plurality of helical members 126a, 126b, 126c, 126d.

In some embodiments, each helical member 124 may extend helically around an outer perimeter of the cage assembly 115 and from the first upper annular member 123 to the first lower annular member 125 such that an upper end of a first helical member (e.g., helical member 124a) vertically overlaps with a lower end of an adjacent first member (e.g., helical member 124d). In other words, both the upper end of the first helical member (e.g., helical member 124b) and the lower end of the adjacent first helical member (e.g., helical member 124d) may intersect a vertical line parallel to the center longitudinal axis 121 of the cage assembly 115.

In one or more embodiments, each of the first helical members 124 forms an angle α with the lower surface of the first upper annular member 123, as well as with the upper surface of the first lower annular member 125. In some embodiments, the angle α may be within a range of about 1° to about 90°, and more particularly, within a range of about 20° to about 70° (e.g., about 45°). The angle α may be selected to ensure that an upper end of a given first helical member (e.g., helical member 124a) will overlap with a lower end of an adjacent first helical member (e.g., helical member 124d).

In one or more embodiments, one or more of the first cage 120 and the second cage 122 may be coupled to an actuator 135 (e.g., a solenoid, motor, an actuated lever, etc.). In some embodiments, as is discussed in greater detail below, the actuator 135 may be configured to rotate the first cage 120 relative to the second cage 122 in a first direction and a second opposite direction about the center longitudinal axis 121 of the cage assembly 115. For instance, the actuator 135 may be operably coupled to a controller 137, which may include a user interface, as well as a microprocessor, or any other processing means capable of processing software code. The software code may be stored on computer-readable media including memory or other data storage that has instructions stored thereon for controlling the actuator. As is described in greater detail below, in some embodiments, the actuator 135 may cause the first cage 120 to oscillate between first and second positions relative to the second cage 122.

In one or more embodiments, the first cage 120 and the second cage 122 may both be disposed within an interior of a respective filtration component 113 (FIG. 1). In some embodiments, the second cage 122 may be fixed relative to the respective filtration component 113 (FIG. 1) and may serve to support the respective filtration component 113 (FIG. 1) and keep the respective filtration component 113 in an open (e.g., inflated, non-collapsed, a set-up) configuration. For instance, the second cage 122 may serve as an inner frame of the respective filtration component 113 (FIG. 1).

In some embodiments, the first and second cages 120, 122 may include a metal material. For instance, the first and second cages 120, 122 may include steel, stainless steel, aluminum, titanium, or any metallic alloy. In additional embodiments, the first and second cages 120, 122 may include a polymer (e.g., a thermoset). In additional embodiments, the first and second cages may include a ceramic coating. In some embodiments, one or more portions of the first and second cages 120, 122 may be formed via additive manufacturing.

In some embodiments, a diameter of the cage assembly 115 may be within a range of about 2.0 inches (5.08 cm) and about 72 inches (182.88 cm). For example, in some embodiments, the cage assembly 115 may have a diameter of about 4.0 inches (10.16 cm).

In operation, the actuator 135 may rotate the first cage 120 about the center longitudinal axis 121 of the cage assembly 115 in a first direction until each of the first helical members of the first plurality of helical members 124 abut against or approximate a second helical members of the second plurality of helical members 126; subsequently, the actuator 135 may rotate the first cage 120 about the center longitudinal axis 121 of the cage assembly 115 in a second opposite direction until each of the first helical members of the first plurality of helical members 124 again abut against or approximate a second helical member of the second plurality of helical members 126, albeit a different second helical member of the second plurality of helical members 126. In other words, the actuator 135 may cause the first cage 120 to oscillate between first and second positions. In some embodiments, the actuator 135 may rotate the first cage 120 about the center longitudinal axis 121 of the cage assembly 115 by an angle β. In one or more embodiments, the angle β may be within a range of about 10° and about 45°. In additional embodiments, the angle β may be within a range of about 45° and about 90°. In yet further embodiments, the angle β may be within a range of about 90° and about 180°.

Rotating the first cage 120 relative to the second cage 122 may cause the helical members of the of the first plurality of helical members 124 to rub across (e.g., scrape against) the interior surface of the respective filtration component 113, and rubbing the helical members of the first plurality of helical members 124 against the interior surface of the respective filtration component 113 may cause the respective filtration component 113 to flex and deform (e.g., bulge), which in turn, may cause material 104 accumulated on the exterior surface of the respective filtration component 113 to be dislodged and fall off the respective filtration bag. Thus, rotating the first cage 120 relative to the second cage 122 may at least partially clean the respective filtration component 113.

In some embodiments, the conveyor system 111 may cause the filtration component 113 to be relatively tight (e.g., taut) against the second cage 122 during use. For example, the blower or fan 114 and resulting air flow (and pressure differential) may suck the filtration component 113 up against the second cage 122 such that movement of the first cage 120 causes the filtration component 113 to deform and flex where the first helical members 124 rub against the interior surface of the filtration component 113. For instance, an average outer diameter of the filtration component 113 during operation may be smaller than an outer diameter of the first cage 120. The operation of the cage assembly 115 is described in greater detail below in regard to FIG. 5.

The cage assemblies of the present disclosure may be advantageous over conventional systems and methods for cleaning filtration components (e.g., bags) of pneumatic conveyance systems. For example, the cage assemblies and methods of the present disclosure do not require vibrating or shaking the filtration components or pneumatic conveyance systems to remove buildup. As mentioned above, shaking can cause significant damage to the filtration components and/or pneumatic conveyance systems and shorten life cycles of the filtration components and/or pneumatic conveyance systems. Conversely, the cage assemblies and methods of the present disclosure do not require shaking and may lead to longer life cycles of the filtration components and/or pneumatic conveyance systems in comparison to conventional systems. Additionally, the cage assemblies and methods of the present disclosure do not require that a velocity of a bulk solid being moved to be reduced to remove buildup, which is required in reverse flow conventional systems. Therefore, the cage assemblies and methods of the present disclosure mitigate a risk and a likelihood of clogs occurring within the pneumatic conveyance systems during operation. Additionally, the cage assemblies and methods of the present disclosure are relatively easy to manufacture, require less energy (e.g., electrical energy) than conventional systems (e.g., compressed air systems), and can be retrofitted to current pneumatic conveyance systems. As a result, the cage assemblies and methods of the present disclosure may decrease costs of operation in comparison to conventional pneumatic conveyance systems and provide a relatively quick and easy replacement system.

Figure 3A:
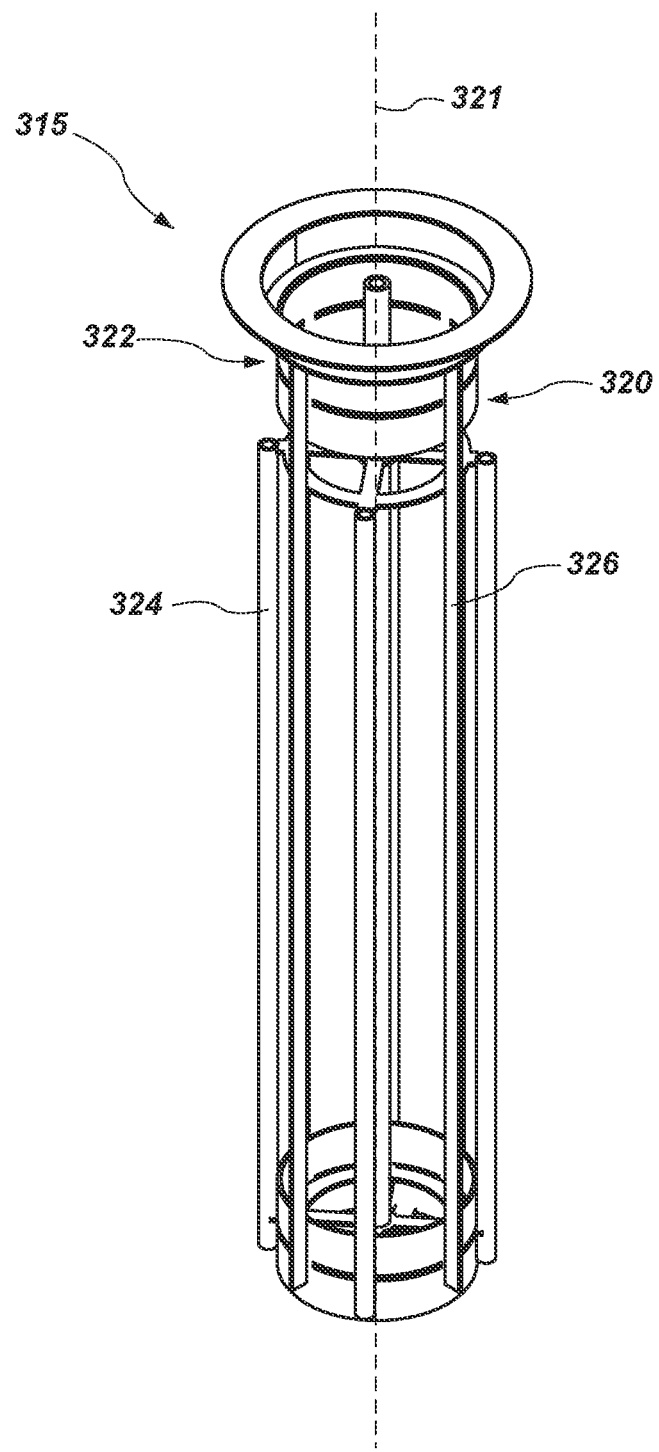
FIG. 3A is perspective view of a cage assembly according to one or more embodiments of the present disclosure.
Figure 3B:
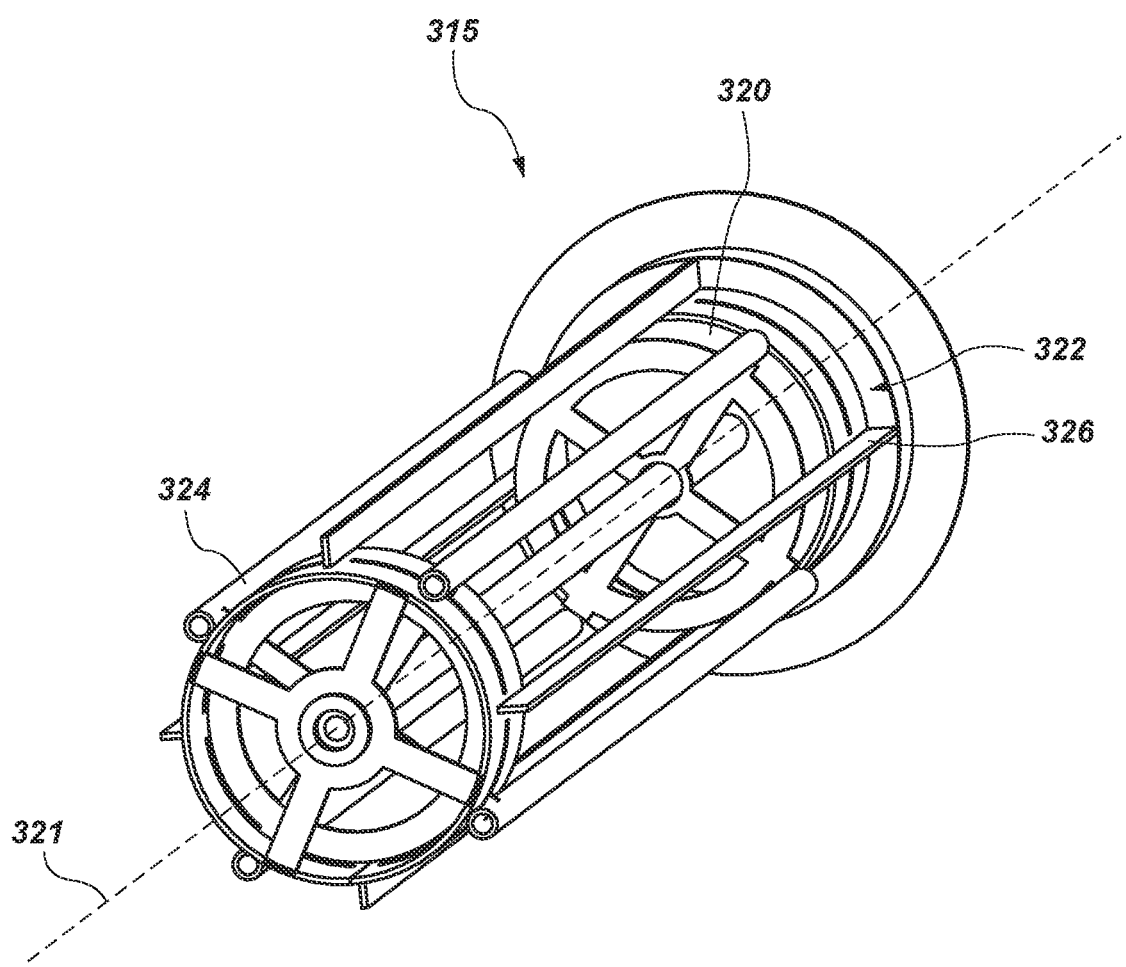
FIG. 3B is a bottom view of the cage assembly of FIG. 3A.
Figure 3C:
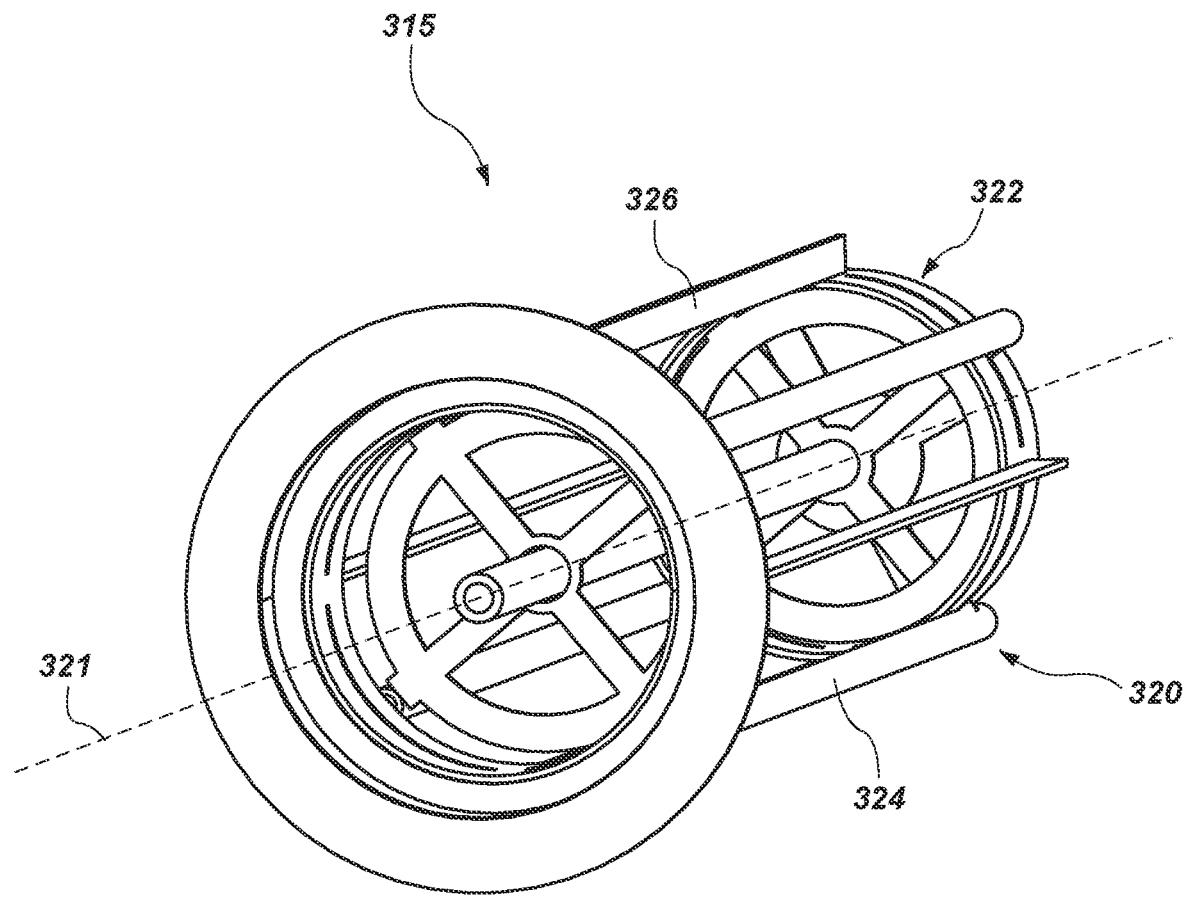
FIG. 3C is a top view of the cage assembly of FIG. 3A.
Figure 3D:
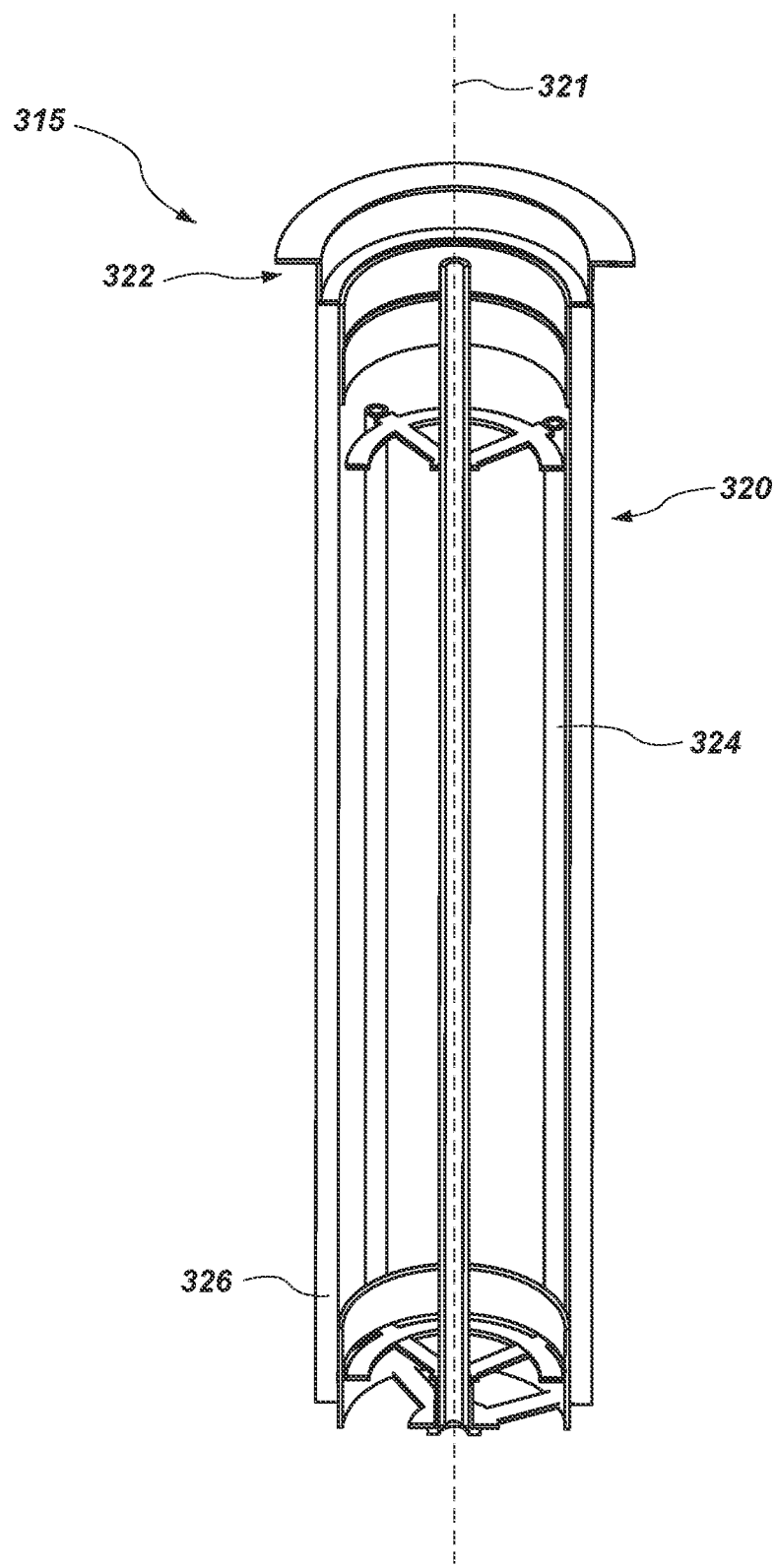
FIG. 3D is a cross-sectional view of the cage assembly of FIG. 3A.
Figure 3E:
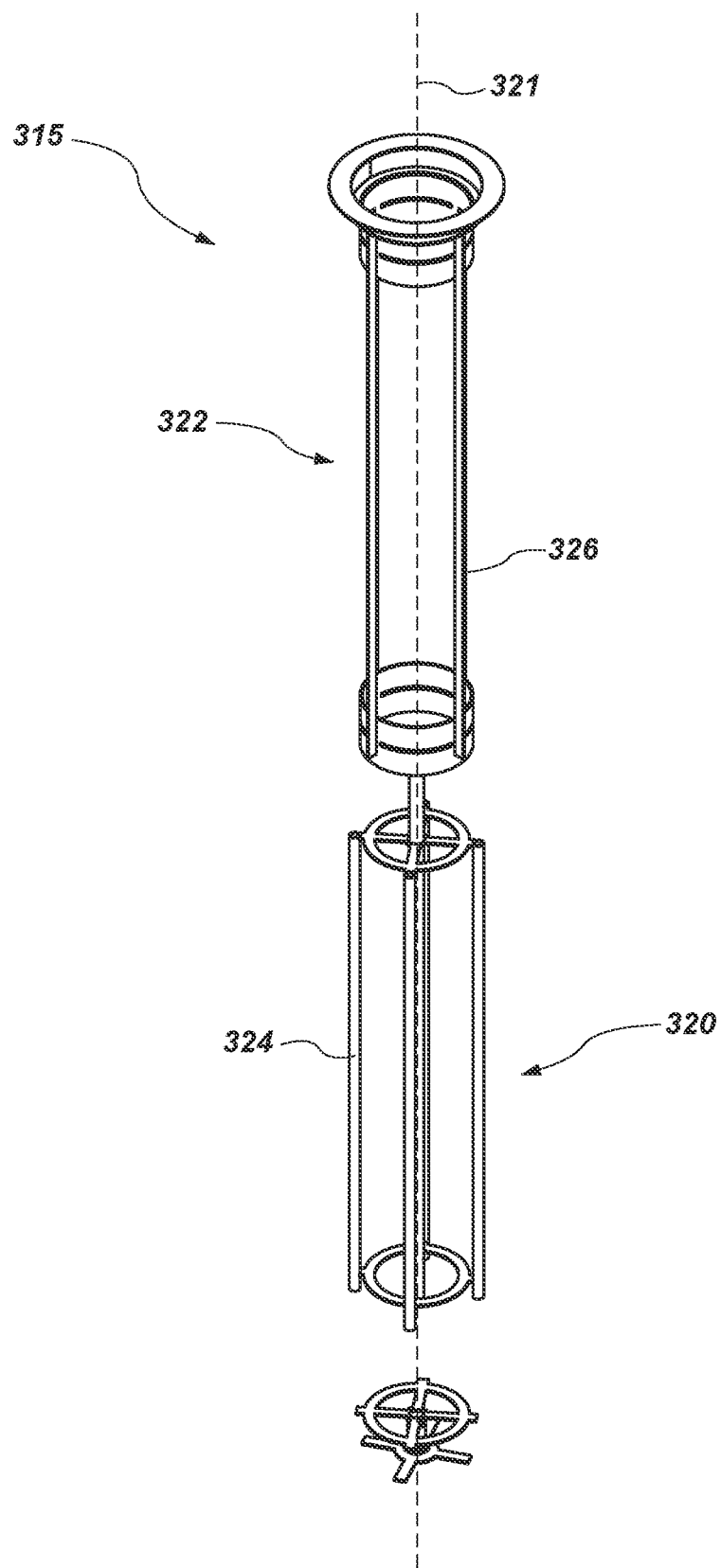
FIG. 3E is an exploded view of the cage assembly of FIG. 3A.

FIG. 3A is a perspective view of a cage assembly 315 according to one or more embodiments of the present disclosure. FIGS. 3B and 3C are bottom and top side views, respectively, of the cage assembly 315 of FIG. 3A. FIG. 3D is a side cross-sectional view of the cage assembly 315 of FIG. 3A. FIG. 3E is an exploded view of the cage assembly 315 of FIG. 3A.

Referring to FIGS. 3A-3E together, similar to the cage assembly 115 described above in regard to FIGS. 2A-2E, the cage assembly 315 may include a first cage 320 and a second cage 322. Furthermore, similar to the cage assembly 115 described above in regard to FIGS. 2A-2E, the first cage 320 and the second cage 322 may share a center longitudinal axis 321, and one of the first or second cages 320, 322 may be configured to rotate about the center longitudinal axis 321 relative to the other of the first or second cages 320, 322.

However, instead of helical members 124, 126, the first and second cages 320, 322 may include linear members 324 and adjacent linear members 326, respectively. The cage assembly 315 may operate in substantially the same manner as the cage assembly 115 described above in regard to FIGS. 2A-2E.

Figure 4A:
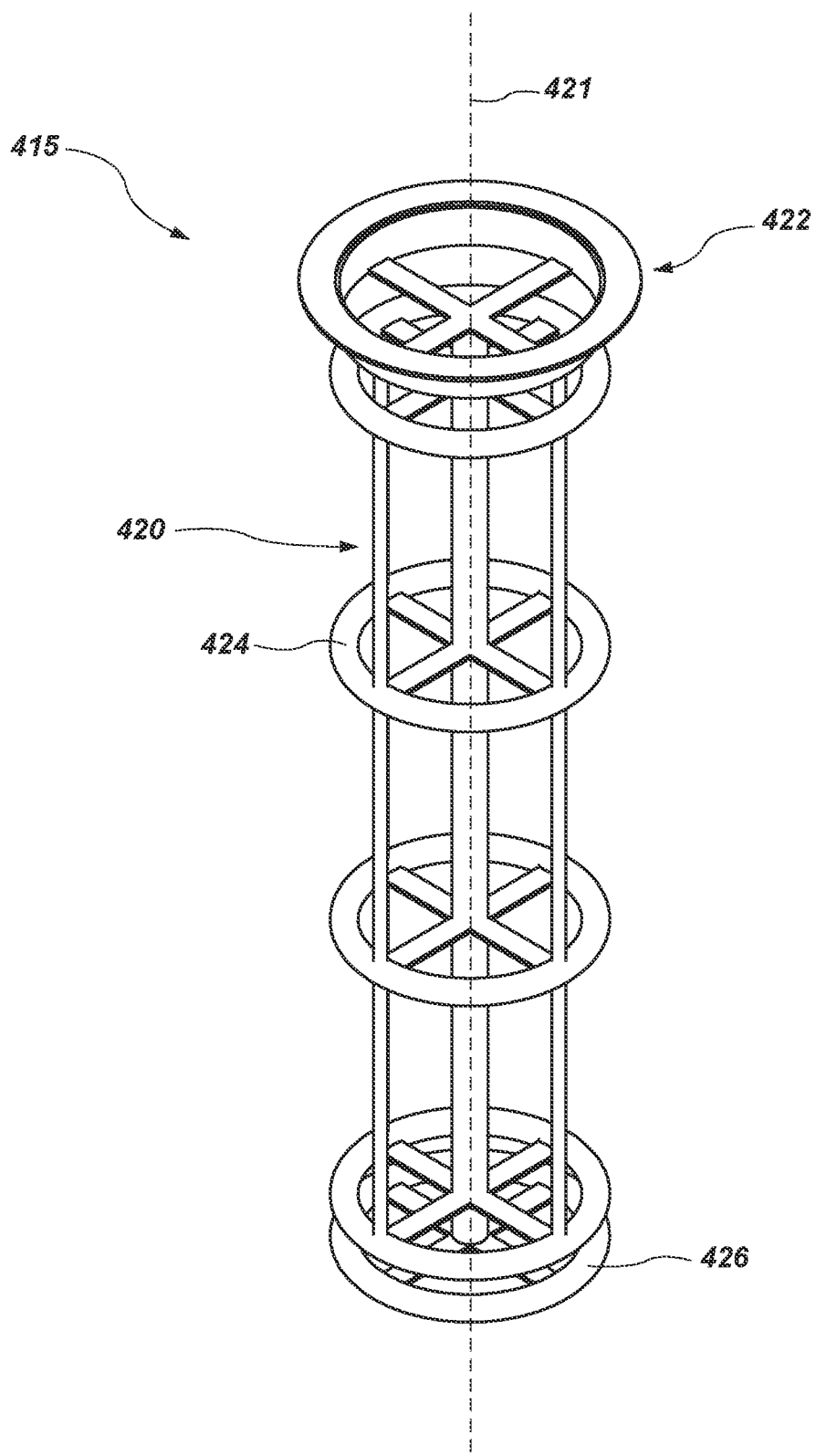
FIG. 4A is a perspective view of a cage assembly according to one or more embodiments of the present disclosure.
Figure 4B:
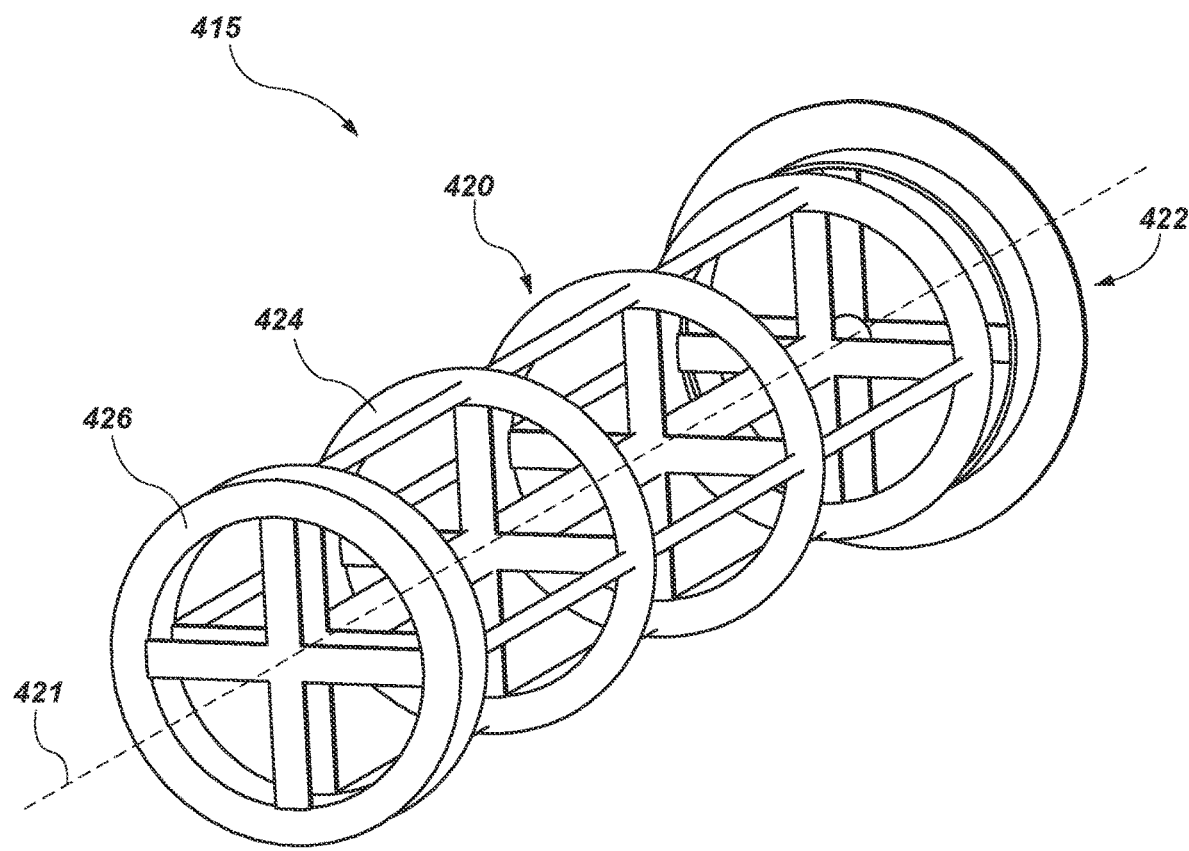
FIG. 4B is a bottom view of the cage assembly of FIG. 4A.
Figure 4C:
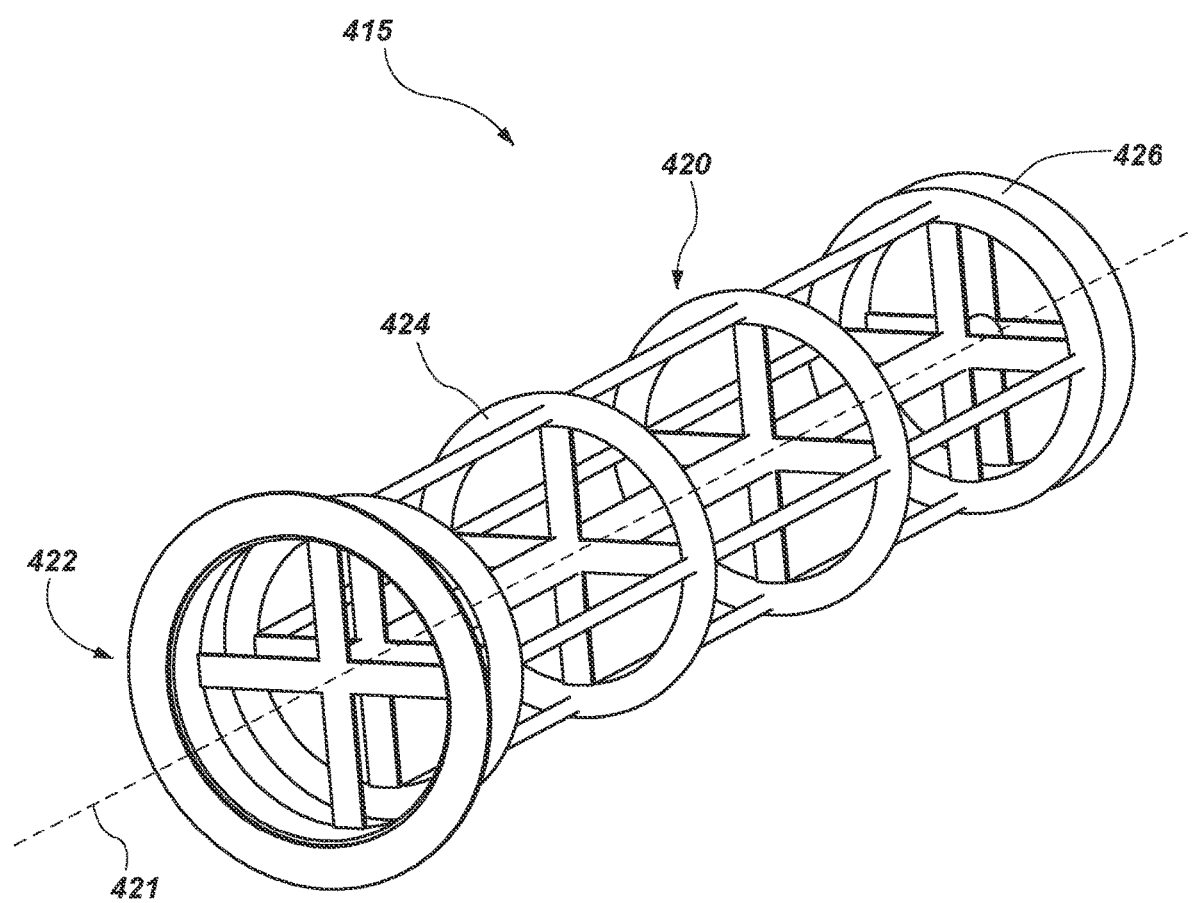
FIG. 4C is a top view of the cage assembly of FIG. 4A.
Figure 4D:
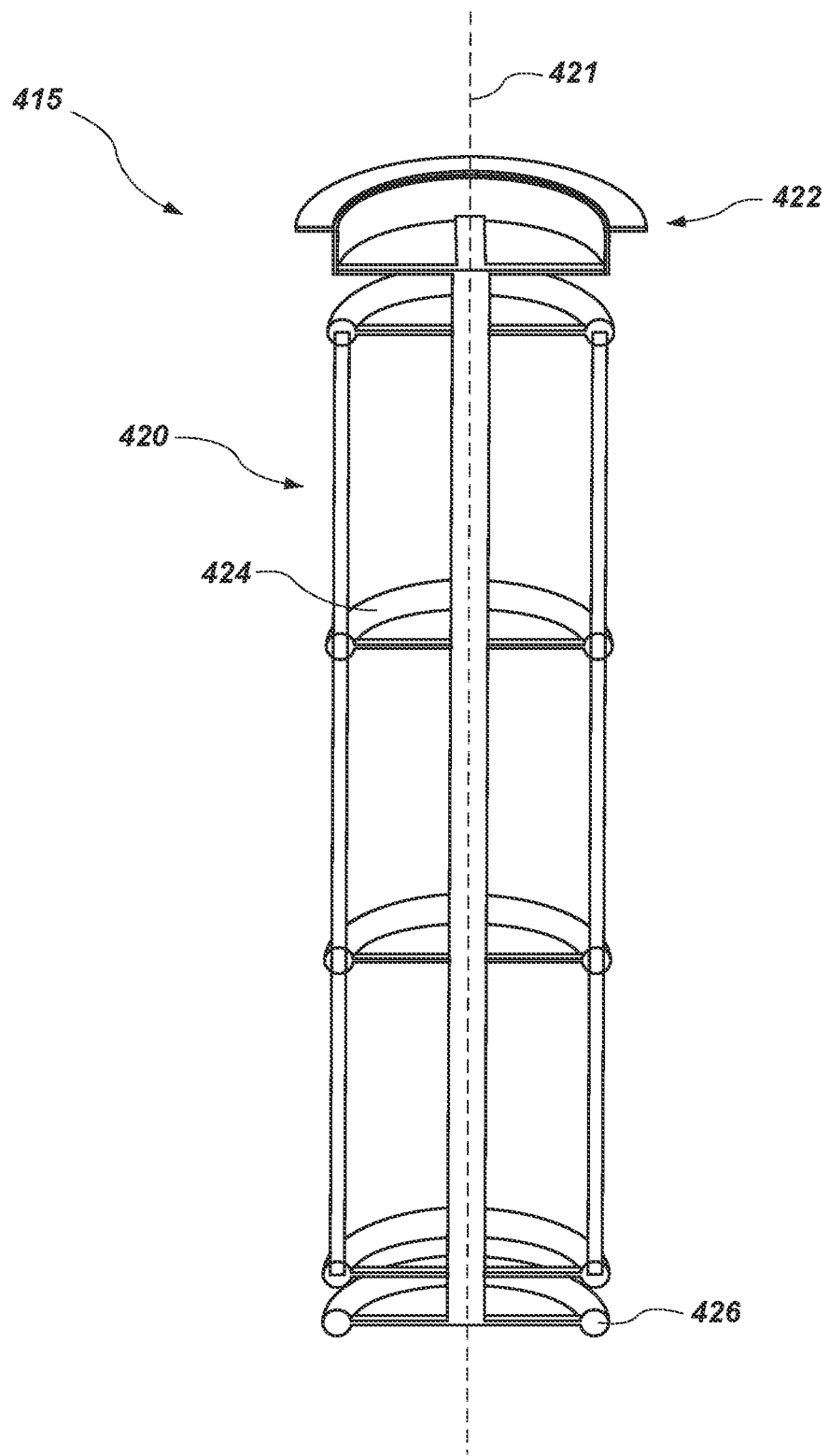
FIG. 4D is a cross-sectional view of the cage assembly of FIG. 4A.
Figure 4E:
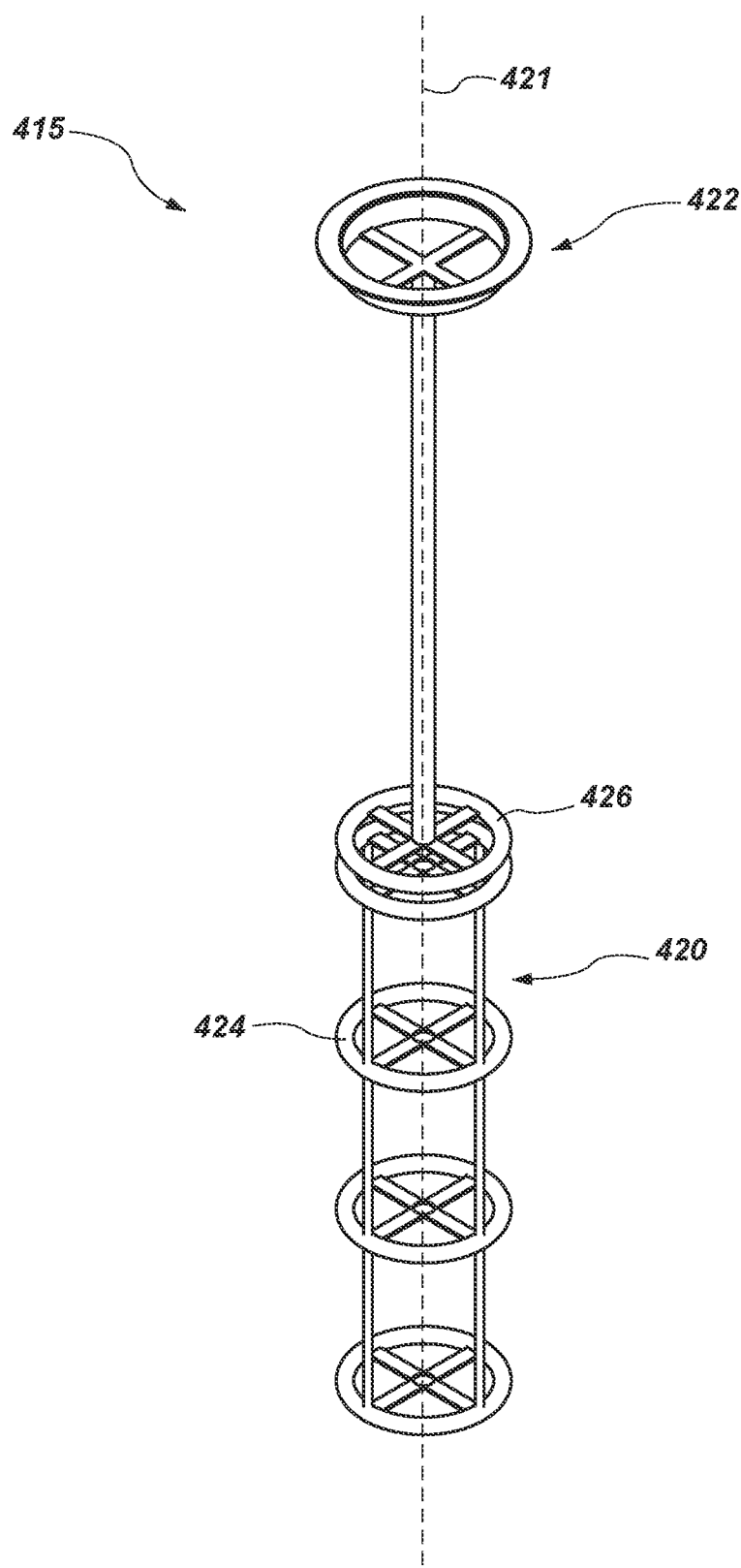
FIG. 4E is an exploded view of the cage assembly of FIG. 4A.

FIG. 4A is a perspective view of a cage assembly 415 according to one or more embodiments of the present disclosure. FIGS. 4B and 4C are bottom and top side views, respectively, of the cage assembly 415 of FIG. 4A. FIG. 4D is a side cross-sectional view of the cage assembly 415 of FIG. 4A. FIG. 4E is an exploded view of the cage assembly 415 of FIG. 4A.

Referring to FIGS. 4A-4E together, similar to the cage assembly 115 described above in regard to FIGS. 2A-2E, the cage assembly 415 may include a first cage 420 and a second cage 422. Furthermore, similar to the cage assembly 115 described above in regard to FIGS. 2A-2E, the first cage 420 and the second cage 422 may share a center longitudinal axis 421.

However, instead of helical members 124, 126, the first and second cages 420, 422 may include first ring members 424 and second ring members 426, respectively. The cage assembly 415 may operate in substantially the same manner to the cage assembly 115 described above in regard to FIGS. 2A-2E, but rather than rotating about the center longitudinal axis 421, one of the first or second cages 420, 422 may move axially along the center longitudinal axis 421 relative to the other of the first or second cages 420, 422. In some embodiments, an axial distance between the first and second ring members 424, 426 may be within a range of about 1.0 inch (2.54 cm) and about 12 inches (30.48 cm.). For example, the distance may be about 8 inches (20.32 cm).

The cage assemblies described above with regard to FIGS. 3A-4E may provide the same advantages over conventional systems described above in regard to FIGS. 2A-2E.

Figure 5:
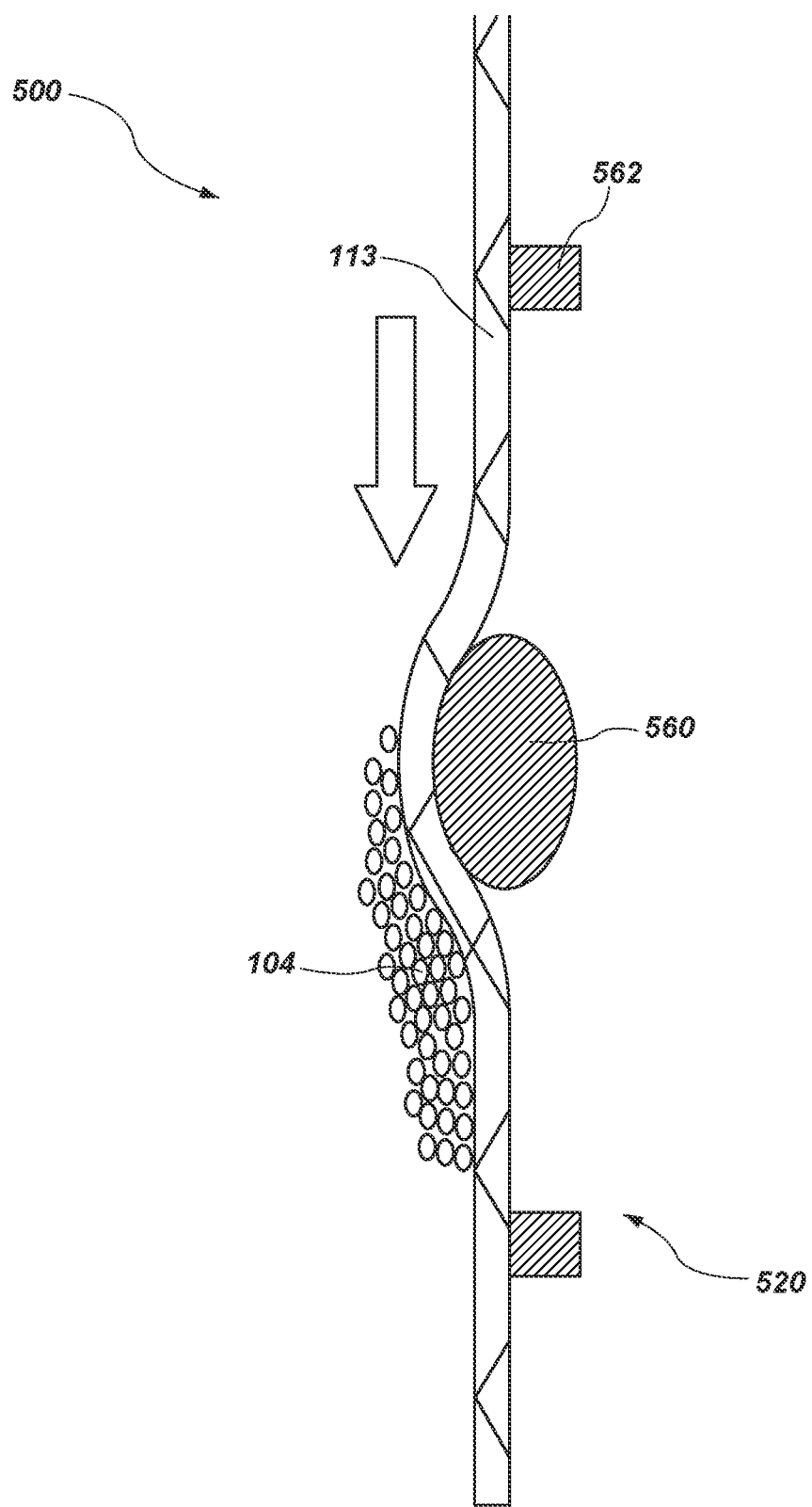
FIG. 5 is a schematic top cross-sectional view of a cage assembly embodiment pressing against the filtration component and dislodging buildup according to one or more embodiments of the present disclosure.
Figure 6:
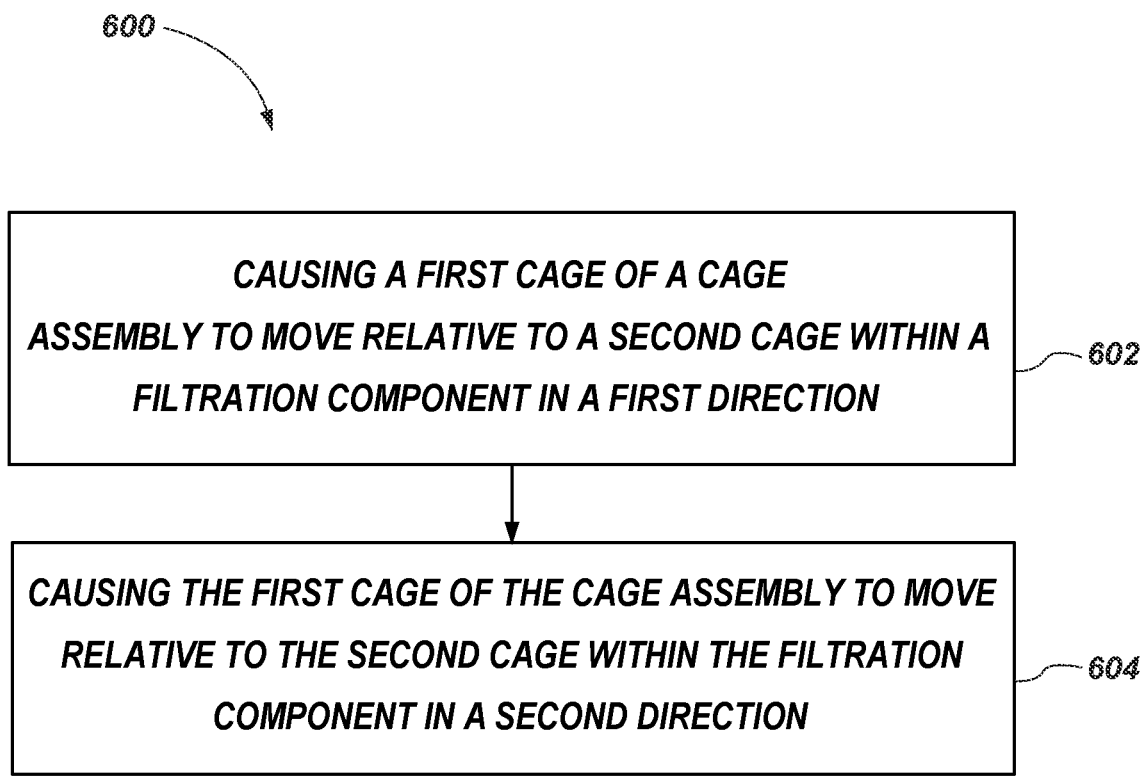
FIG. 6 is a flow chart illustrating a method of dislodging material buildup within a pneumatic conveyance system using a cage assembly according to one or more embodiments of the present disclosure.

FIG. 5 is a schematic top cross-sectional view of a first member 560 of a given cage 520 of a cage assembly 500 pressing (e.g., rubbing) against a filtration component 113 (e.g., a filtration bag) and dislodging buildup according to one or more embodiments of the present disclosure. FIG. 6 is a flow chart illustrating a method 600 of dislodging buildup using a cage assembly according to one or more embodiments of the present disclosure.

Referring to FIGS. 5 and 6 together, the first member 560 may include any of the first members described above in regard to first cages 120, 320, 420, and a second member 562 of a second cage may include any of the second members described above in regard to second cages 122, 322, 422.

In some embodiments, the method may include, in response to an event (e.g., a user input, a timing sequence, a sensor reading, etc.), causing the first cage of the cage assembly to move relative to the second cage within a filtration component 113 of a pneumatic conveyance system in a first direction, as shown in act 602 of FIG. 6. For instance, act 602 of the method 600 may include causing the first cage to move relative to the second cage in any of the manners described above in regard to FIGS. 1-4E. For example, the method 600 may include rotating the first cage about a center longitudinal axis of the cage assembly in the first direction until each of the first member abuts against or approximates the second member 562. In other embodiments, the method 600 may include causing the first member 560 of the first cage to translate axially along the longitudinal axis of the cage assembly relative to the second member 562 of the second cage.

The method may further include causing the first cage to move relative to the second cage within the filtration component in a second opposite direction, as shown in act 604 of FIG. 6. For instance, act 604 of the method 600 may include causing the first cage to move relative to the second cage in any of the manners described above in regard to FIGS. 1-4E.

Moving the first cage relative to the second cage may cause the first cage to rub across (e.g., scrape against) the interior surface of the filtration component 113, and may further cause the filtration component 113 to flex and deform (e.g., bulge). A resulting deformity of the filtration component 113 may translate (e.g., move up or down or angularly) along the filtration component 113 in directions parallel or orthogonal to a center longitudinal axis of the first cage as the first cage moves (e.g., rotates or translates). The deformity and the movement of the deformity may cause material 104 accumulated on the exterior surface and/or within a wall of the filtration component 113 to be dislodged and fall off the filtration component. Thus, moving the first member 560 relative to the second member 562 may at least partially clean the respective filtration component 113.

Figure 7:
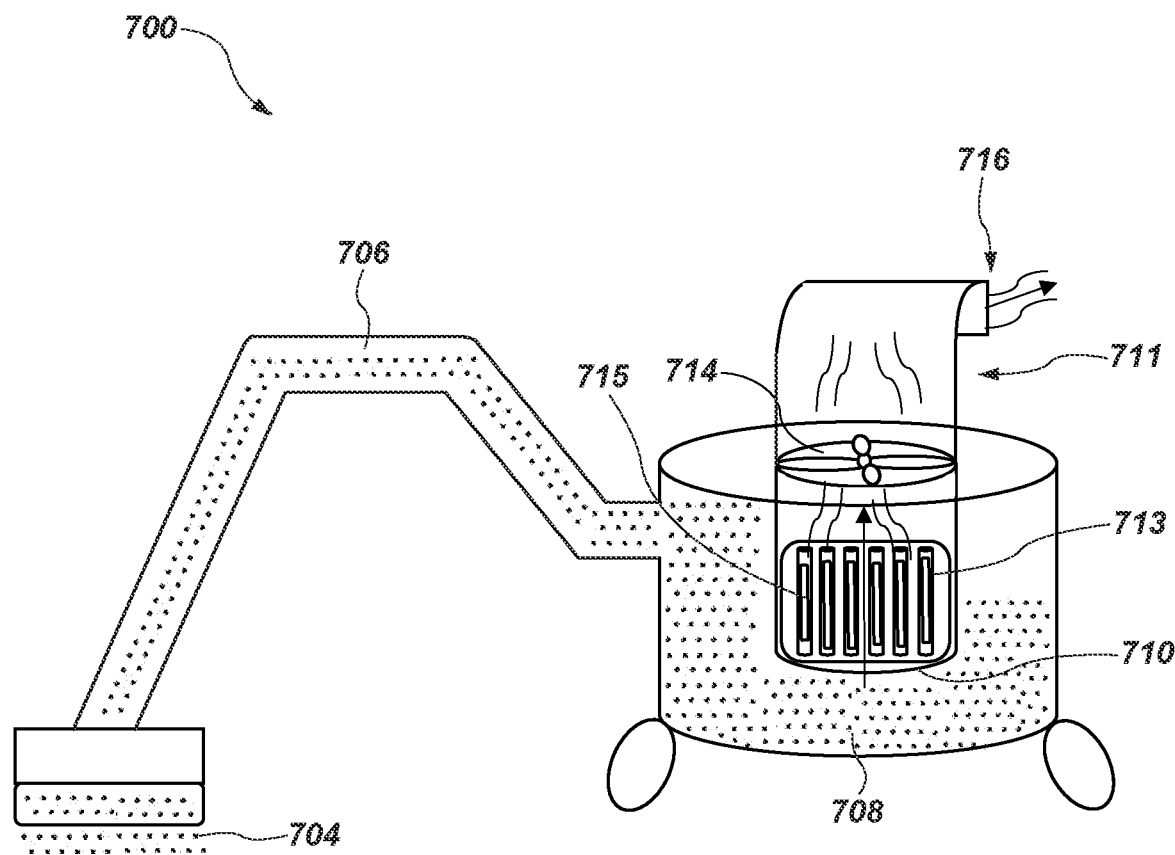
FIG. 7 is a schematic view of a pneumatic conveyance system according to one or more embodiments of the present disclosure.

FIG. 7 is a schematic view of a pneumatic conveyance system according to one or more embodiments of the present disclosure. This pneumatic conveyance system 700 may include, for example, a vacuum system, where suction draws material 704 into the pneumatic conveyance system 700 and is dislodged in an analogous manner to that described in regard to FIG. 1. Any of the cage systems and methods described above in regard to FIGS. 2A-6 may be utilized in the pneumatic conveyance system of FIG. 7. However, the filtration component 713 of the pneumatic conveyance system 700 (e.g., the vacuum) may include any conventional filtration component of vacuums (e.g., a cartridge filter).

Referring to FIGS. 1-7 together, in additional embodiments, one or more of the first cage (e.g., first cage 120) and the second cage (e.g., second cage 122) may be disposed on the exterior of the filtration component. For example, the second cage may be fixed relative to the respective filtration component, may be disposed within the respective filtration component, and may serve as an inner frame of the respective filtration component. The first cage may be disposed on an exterior of the respective filtration component and may be configured to rotate relative to the second cage in any of the manners described above. For instance, the first cage may have an arcuate radially innermost surface for rubbing against an exterior surface of the respective filtration component 113.

Referring to FIGS. 1-4E together, in additional embodiments, the first cage (e.g., first cage 120) may be rotatable by 360° relative to the second cage (e.g., second cage 122). For example, the first cage may only rotate in one direction relative to the second cage.

Referring still to FIGS. 1-4E together, in some embodiments, the first cage may include a first upper annular member, a first lower annular member, and at least one coil member extending between the first upper annular member and the first lower annular member. The coil member may extend in a spring shape around an outer perimeter of the cage assembly. In some embodiments, the coil member may have an arcuate radially outermost surface for rubbing against an interior surface of an associated filtration component. The second cage may include a second upper annular member, a second lower annular member, and a plurality of linear members extending between the second upper annular member and the second lower annular member. For instance, the second cage may include a second cage similar to the second cage described above in regard to FIGS. 3A-3E. Furthermore, an outermost diameter of the second cage may be smaller than an innermost diameter of the first cage (e.g., the second cage may be oriented relative to the first cage). The first cage may be coupled to an actuator, and the actuator may be configured to rotate the first cage relative to the second cage via any of the manners described above. In some embodiments, the coil member may have a general blade shape for contacting the interior surface of the associated filtration component.

While certain illustrative embodiments have been described in connection with the figures, those of ordinary skill in the art will recognize and appreciate that the scope of this disclosure is not limited to those embodiments explicitly shown and described herein. Rather, many additions, deletions, and modifications to the embodiments described herein may be made to produce embodiments within the scope of this disclosure, such as those hereinafter claimed, including legal equivalents. In addition, features from one disclosed embodiment may be combined with features of another disclosed embodiment while still being within the scope of this disclosure, as contemplated by the inventor.

What is claimed is:

1. A pneumatic conveyance system, comprising:
at least one filtration component;
a cage assembly comprising:
a first cage within the at least one filtration component, the first cage comprising:
a first upper annular member;
a first lower annular member; and vertically extending helical members extending between the upper annular member and the lower annular member;
a second cage within the at least one filtration component; and
an actuator coupled to the first cage and configured to move the first cage relative to the second cage and cause at least a portion of the first cage to rub against an interior surface of the at least one filtration component and deform the at least one filtration component to remove material from an exterior surface of the at least one filtration component.

2. The pneumatic conveyance system of claim 1, wherein the first cage is movable relative to the at least one filtration component.

3. The pneumatic conveyance system of claim 1, wherein the first cage is disposed within the second cage.

4. The pneumatic conveyance system of claim 1, wherein the first cage and the second cage share a longitudinal axis.

5. The pneumatic conveyance system of claim 1, wherein the second cage comprises a second upper annular member and a second lower annular member, the first upper annular member and the first lower annular member of the first cage vertically between the second upper annular member and the second lower annular member of the second cage.

6. The pneumatic conveyance system of claim 1, wherein each helical member of the first cage is disposed between two adjacent second helical members of the second cage.

7. The pneumatic conveyance system of claim 1, wherein the actuator is configured to rotate the first cage in a first direction until at least one vertically extending helical member contacts at least an additional vertically extending helical member of the second cage.

8. The pneumatic conveyance system of claim 1, wherein the actuator is configured to cause the first cage to oscillate between a first position and a second position.

9. An assembly, comprising:
a cage assembly, comprising:
a first cage; and
a second cage;
a filtration component around the case assembly; and
an actuator coupled to the first cage and configured to rotate the first cage relative to the filtration assembly to facilitate removal of material from the filtration component.

10. The assembly of claim 9, further comprising an additional cage assembly, the additional cage assembly coupled to an additional actuator configured to rotate a first cage of the additional cage assembly relative to an additional filtration component disposed around the additional cage assembly.

11. The assembly of claim 9, wherein the actuator is configured to rotate the first cage in a first direction and a second direction opposite the first direction.

12. The assembly of claim 9, wherein the second cage is fixed relative to the filtration component.

13. The assembly of claim 9, wherein the actuator is configured to rotationally oscillate the first cage within a range of from about 45° and about 90°.

14. An assembly:
a cage assembly disposed within the at least one filtration component, and comprising:
a first cage comprising first helical members; and
a second cage within the first cage and comprising second helical members, the first cage configured to rotate relative to the second cage about a center longitudinal axis shared by the first cage and the second cage; and
a filter disposed around the first cage and the second cage.

15. The assembly of claim 14, wherein the filter contacts the first helical members and the second helical members.

16. The assembly of claim 14, wherein at least one of the first helical members is disposed between two of the second helical members.

17. The assembly of claim 14, wherein the first helical members extend from a first annular upper member of the first cage to a first annular lower member of the first cage.

\* \* \* \* \*